(12) United States Patent
Nye

(10) Patent No.: US 10,990,394 B2
(45) Date of Patent: Apr. 27, 2021

(54) SYSTEMS AND METHODS FOR MIXED INSTRUCTION MULTIPLE DATA (XIMD) COMPUTING

(71) Applicant: Intel Corporation, Santa Clara, CA (US)

(72) Inventor: Jeffrey L. Nye, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 697 days.

(21) Appl. No.: 15/719,109

(22) Filed: Sep. 28, 2017

(65) Prior Publication Data
US 2019/0095208 A1 Mar. 28, 2019

(51) Int. Cl.
*G06F 9/30* (2018.01)
*G06F 9/38* (2018.01)

(52) U.S. Cl.
CPC ........ *G06F 9/30058* (2013.01); *G06F 9/3887* (2013.01); *G06F 9/3891* (2013.01)

(58) Field of Classification Search
None
See application file for complete search history.

(56) References Cited

U.S. PATENT DOCUMENTS

| | | | | |
|---|---|---|---|---|
| 8,200,940 | B1 * | 6/2012 | Lindholm | G06F 9/3887 712/22 |
| 2003/0005365 | A1 * | 1/2003 | Wilson | G06F 9/30072 714/38.13 |
| 2005/0278514 | A1 * | 12/2005 | Wilson | G06F 9/30072 712/234 |
| 2007/0219771 | A1 * | 9/2007 | Verheyen | G06F 30/33 703/15 |
| 2014/0129783 | A1 * | 5/2014 | Marathe | G06F 9/522 711/147 |
| 2014/0215187 | A1 * | 7/2014 | Yazdani | G06F 9/3802 712/206 |
| 2016/0132338 | A1 * | 5/2016 | Jin | G06F 9/3802 712/206 |

OTHER PUBLICATIONS

Wolfe, A., etal., A Variable Instruction Stream Extension to the VLIW Architecture, 1991, ACM. pp. 2-14. (Year: 1991).*
Zhong, H., etal., A Distributed Control Path Architecture for VLIW Processors, 2005 IEEE, 10 pages. (Year: 2005).*

* cited by examiner

*Primary Examiner* — Eric Coleman
(74) *Attorney, Agent, or Firm* — Fletcher Yoder, P.C.

(57) ABSTRACT

An integrated circuit may include a mixed instruction multiple data (xIMD) computing system. The xIMD computing system may include a plurality of data processors, each data processor representative of a lane of a single instruction multiple data (SIMD) computing system, wherein the plurality of data processors are configured to use a first dominant lane for instruction execution and to fork a second dominant lane when a data dependency instruction that does not share a taken/not-taken state with the first dominant lane is encountered during execution of a program by the xIMD computing system.

20 Claims, 8 Drawing Sheets

SYSTEMS AND METHODS FOR MIXED INSTRUCTION MULTIPLE DATA (XIMD) COMPUTING

BACKGROUND

This disclosure relates to systems and methods for instruction multiple data computing and, more specifically, for mixed instruction multiple data computing.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

An integrated circuit may contain fixed logic suitable, for example, for us in computing applications. Integrated circuits may also contain programmable logic fabric that provides a highly flexible platform that can be configured after manufacturing with a custom circuit design. The flexibility and variability in the possible designs that may be programmed into this type of integrated circuit also provides for various parallel computing architectures that may be used to process data. In one example, single instruction multiple data (SIMD) architectures may be used, which may perform the same operation on multiple data items simultaneously. In another example, multiple instruction multiple data (MIMD) architectures may be used, which include multiple processors that may function asynchronously and independently to process the multiple data items. It may be beneficial to improve on SIMD and/or MIMD architectures to deliver more efficient computing of, for example, multiple data items, in integrated circuits.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
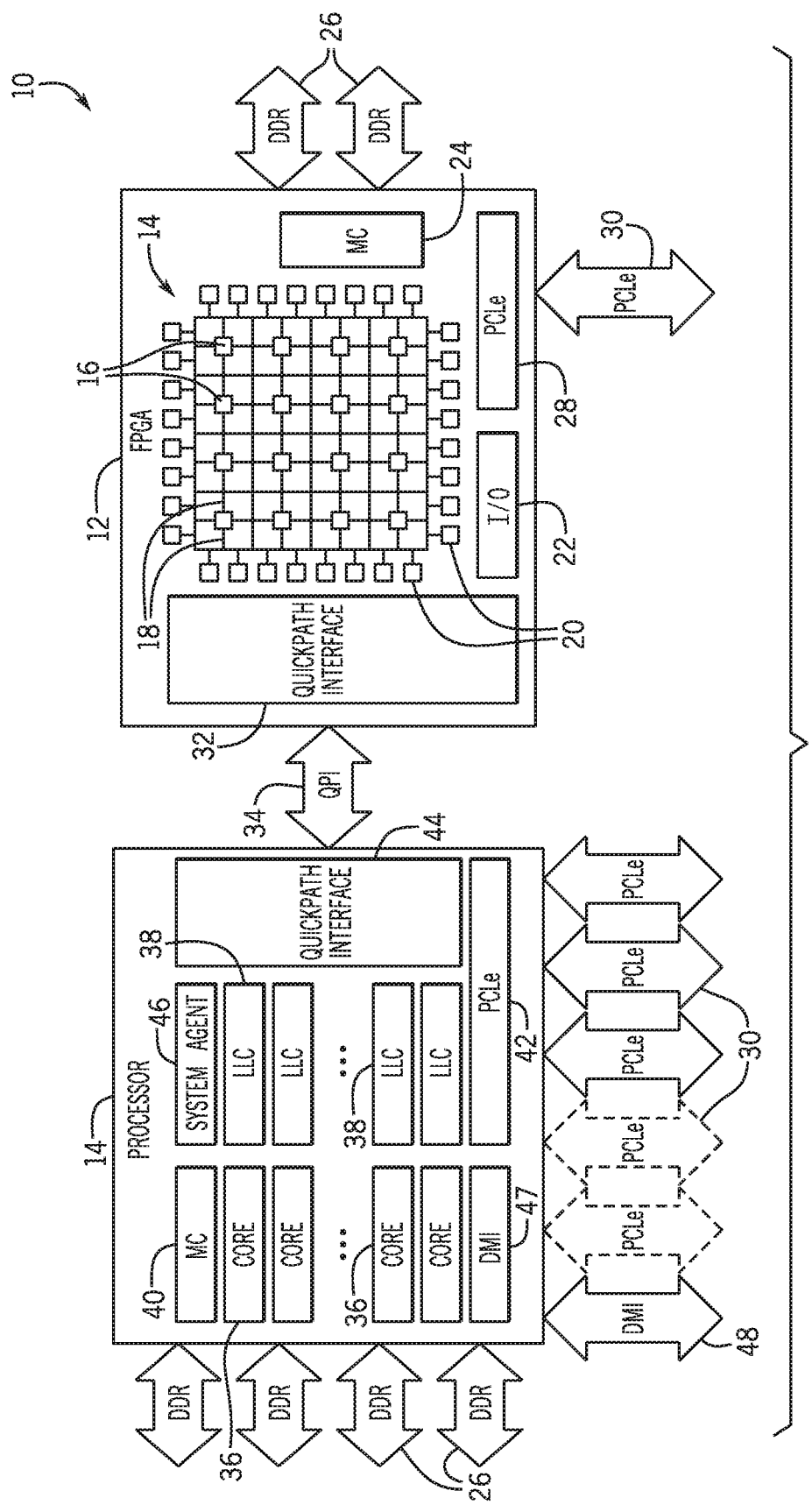
FIG. 1 is a block diagram illustrating an embodiment of a computing system having a processor system communicatively coupled to an integrated circuit (e.g., field programmable gate array (FPGA)) system.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. It will be recognized by one skilled in the art, that the present exemplary embodiments may be practiced without some or all of these specific details. In other instances, well-known operations have not been described in detail in order not to unnecessarily obscure the present embodiments.

An integrated circuit may include parallel computing techniques such as a wide single instruction multiple data (SIMD) architecture or system. However, SIMD architectures tend to have problems when encountering data-dependent branches. A common expression of a data dependent branch is the if/then/else clause found in programming languages. The 'if' condition is evaluated, e.g. if (A>B), the result determines whether the code in the 'then' clause (the TAKEN clause) is executed or the code in the 'else' clause (the NOTTAKEN clause) is executed. SIMD architectures can exhibit performance reduction when data dependent branches are executed. In a SIMD architecture, at each data dependent branch, some set of lanes will take the branch and some set of lanes will not take the branch. This results in one set of lanes stalling so that the other lanes can continue execution. This effect can dramatically reduce the performance and efficiency of program execution.

For example, an instruction such as "if A>B then . . . " may result in data dependency based on the values for A and for B. A SIMD system would typically stall, as the data dependency would not result in all lanes performing the same operation or instruction on multiple data items simultaneously. That is, a first lane may be able to perform the "then" portion while a second lane may not because of different A and B data values encountered by the first and the second lane or any other subsequent lane.

The techniques described herein may automatically create secondary execution paths using wide SIMD architectures. At reset, all lanes may execute code from a primary instruction memory. Lane 0 controls a program counter (e.g., counter containing an instruction address) for the primary instruction memory. Lane 0 is thus the default dominant lane. As program execution proceeds, a data-dependent branch is decoded and either taken or not-taken by each lane in the SIMD device. Those lanes whose taken/not-taken state is the same as Lane 0 continue to have their instruction stream generated by Lane 0. The remaining lanes, i.e. lanes not having the same taken/not-taken state as Lane 0 automatically select a new dominant lane. The selection of a new dominant lane is referred to herein as a fork.

A fork creates a new program counter thread for the other lanes, i.e., lanes whose taken/not-taken state is not the same as Lane 0. The new dominant lane now controls a new program counter for a secondary instruction memory. Access to a secondary instruction memory may be arbitrated, as further described below. Indeed, during execution, additional data-dependent branches potentially create new forks, and new dominant lanes may be automatically created for these forks. In one embodiment, the new dominant lanes now arbitrate for access to a secondary instruction memory. Other embodiments may use multi-port memories, duplicating the instruction memory (finding an optimal selection in the design space between performance and cost) in lieu of arbitration. There can also be a secondary bus to a non-arbitrated memory, there could be a cache system, etc. Indeed, while an embodiment, uses arbitration, arbitration is not a requirement for the techniques described herein. A synchronization instruction may be used to create a barrier, thus allowing all lanes to complete. Synchronization is optional, but may be provided as part of the xIMD techniques described herein. Accordingly, xIMD systems automatically migrate from full SIMD towards a MIMD configuration in the presence of data dependent branches.

With the foregoing in mind, FIG. 1 illustrates a block diagram of an embodiment of a computing system 10 that may include any suitable logic device, such as an integrated circuit 12 (e.g., field programmable gate array (FPGA)). Although the examples described below will recite the integrated circuit 12, it should be appreciated that any other suitable integrated circuit (e.g., another form of programmable logic device, an application-specific integrated circuit (ASIC), application-specific standard product (ASSP), or the like), may be used. The computing system 10 may additionally include a processor (e.g., microprocessor) 14 communicatively coupled to the integrated circuit 12. In the depicted embodiment, the integrated circuit 12 includes a programmable gate array 14 of logic blocks 16 coupled via reconfigurable interconnections 18. The logic blocks 16 may include flip flops, lookup tables (LUTs), full adders (FAs), and so on, and may perform binary logic calculations (e.g., AND, OR, XOR, etc.) as well as more complex computations (e.g., mathematical operations, digital signal processing when referred to as hard logic blocks). The interconnections 18 enable the logic blocks 16 to be "wired" in different ways, thus creating any number of designs for data processing. Input/Output (I/O) pads 20 may be used to send and to receive data to and from the gated array 14, and an I/O system 22 may be used to send and to receive data to and from the integrated circuit 12.

A memory controller system 24 may interface with a variety of external memory for data storage and retrieval, such as double data rate (DDR) memory 26, including DDR version 2 (DDR2), DDR version 3 (DDR3), DDR version 4 (DDR4), or newer versions of DDR memory. The integrated circuit 12 may also include a Peripheral Component Interconnect Express (PCIe) system 28 suitable for communicatively coupling the integrated circuit 12 to a variety of external systems via a high-speed bus 30.

In some embodiments, the integrated circuit 12 may additionally include a QuickPath Interface system 32, which may use a QuickPath Interconnect 34 to enable a point-to-point interconnection (e.g., private connection that does not have to share bandwidth with others) between the integrated circuit 12 and the processor 14. Thus connected, the integrated circuit 12 and the processor 14 may provide, for example, accelerator-based computing for the computing system 10 where user may define a custom accelerator for the integrated circuit 12 via user programming to accelerate certain processor 14 applications. For example, the integrated circuit 12 may be programmed as a custom deep learning system accelerator, a custom digital signal processing system accelerator, a custom cryptoanalysis system accelerator, and so on.

The processor 14 may be a microprocessor which includes a number of data processing cores 36, with each core 36 communicatively coupled to a respective last level cache 38. The cores 36 may be software programmable to execute a variety of data processing functions, and may access cached data from the caches 38 during data processing for faster execution of the software. External data access to and from the processor 14 may be provided via a memory controller 40, which may be communicatively coupled to multiple DDRs 26. Communications with external systems may be provided via a PCIe system 42 and one or more PCIe buses 30.

In the embodiment shown, the processor 14 includes a QuickPath Interface system 44, which may use the QuickPath Interconnect 34 to point-to-point interconnect with the integrated circuit 12. Other interfaces between the processor 14 and the integrated circuit 12 may be used. Also shown is a system agent 46, which may include certain functions of a microprocessor that are not in the cores 36, but which when closely connected to the cores 36 achieve higher performance. The processor 14 may include a direct media interface (DMI) controller 47 to create a point-to-point link with downstream DMI systems 48, for example, by using multiple lanes and differential signaling.

As mentioned earlier, the integrated circuit 12 is programmable such that a user may execute a program to convert the integrated circuit 12 into a custom hardware system. Indeed, a hardware design may be implemented via design software, such as a version of Quartus by Intel Corporation. The integrated circuit 12, for example, may have its hardware custom designed to implement a xIMD computing system architecture, as further described below. Further, while the xIMD computing system may be implemented via the integrated circuit 12, it is to be understood that the techniques described herein may be implemented in other chip types, including traditional microprocessors, application-specific integrated circuits (ASICs), custom chip designs, and so on.

Figure 2:
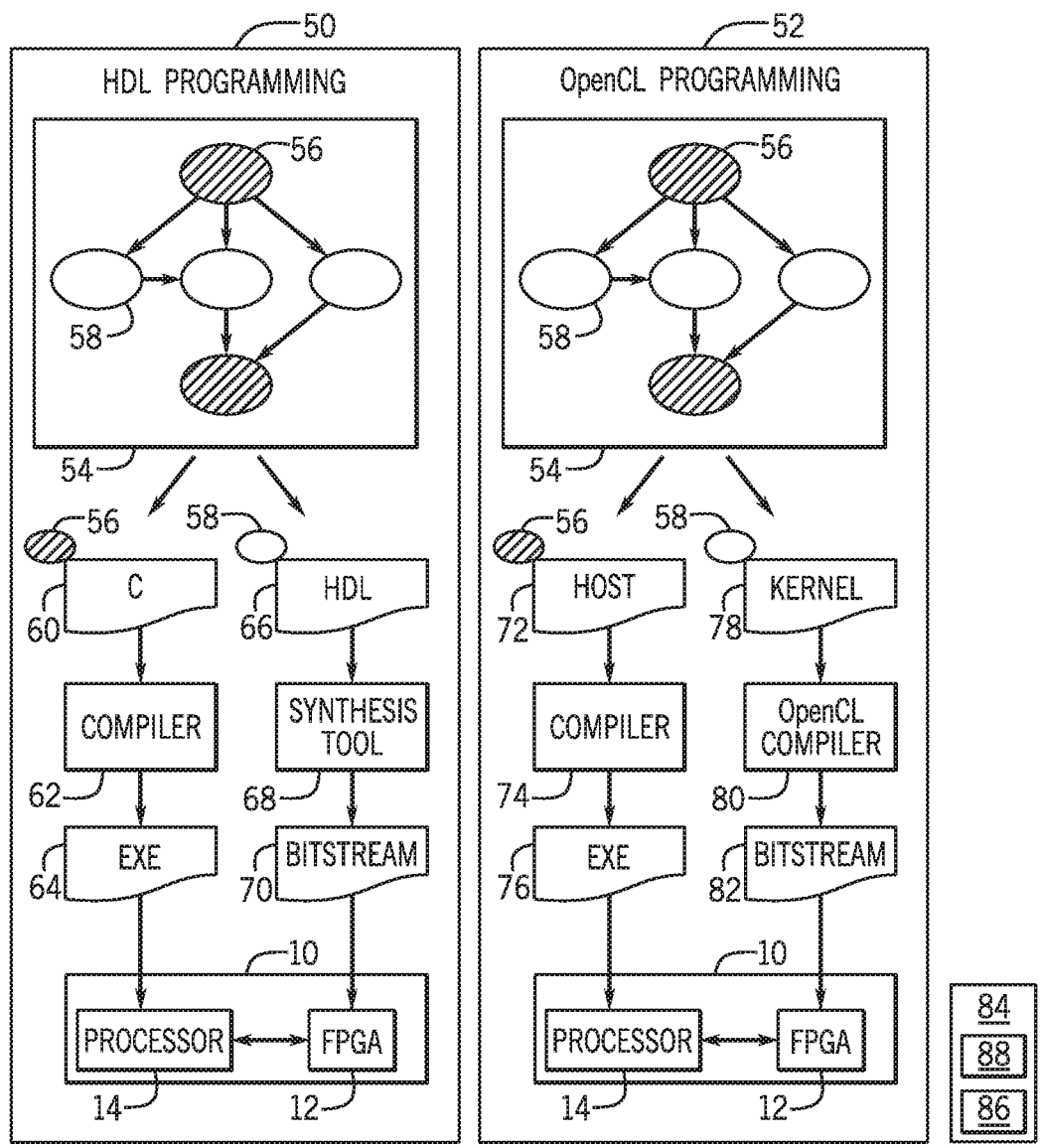
FIG. 2 is a diagram of embodiments of two side-by-side tool flows and of a computing system that may be used to implement xIMD techniques.

Turning now to FIG. 2, the figure illustrates embodiments of two side-by-side tool flows 50, 52, which may be used to enter or otherwise program a hardware design into the integrated circuit 12, such as a xIMD computing system hardware design, as well as to program software executable by the processor 14. The tool flow 50 depicts the use of hardware description language (HDL) programming techniques while the tool flow 50 depicts the use of Open Computing Language (OpenCL) programming techniques. The HDL programming techniques may include Verilog HDL, Very High Speed Integrated Circuit (VHSIC) VHDL, and similar hardware description languages. The OpenCL programming techniques may include open standards.

A program logic 54 may include software 56 to be executed by the processor 14 as well as a hardware design 58 to be implemented in the integrated circuit 12 (e.g., xIMD computing system). Indeed, the program logic 54 may collaboratively merge software elements, such as the software 56, with custom hardware designs, such as the hardware design 58. The user may choose the tool flow 50 and/or the tool flow 52 to implement the program logic 54 based on using HDL tools and techniques and/or OpenCL tools and techniques. For example, to implement the software 56 using the HDL tool flow 50, a program 60 may be written in the C programming language. The program 60 may then be compiled via a compiler system 62 to result in an executable 64. The executable 64 may then be executed via the processor 14. The hardware design 58 may be implemented as a HDL file(s) 66, which may then be converted via synthesis tool 68 (e.g., HDL compiler) into a low-level circuit-design program or bitstream 70, sometimes known as a program object file, which programs the integrated circuit 12.

When using the tool flow 52, the software 56 may be implemented as OpenCL host file(s) 72, which may be compiled via a compiler 74 into an executable 76. The executable 76 may then be executed via the processor 14. To implement the hardware design 58, kernel file(s) 78 may be written, that define the hardware design 58 in a kernel language. The kernel file(s) 78 may then be compiled via an OpenCL compiler 80 into a low-level circuit-design program or bitstream 80, which may then be used to program the integrated circuit 12. Accordingly, the program logic 54 may be executed, in some cases collaboratively, by the integrated circuit 12 and the processor 14.

A computing system 84 may be used to store and/or execute the tool flows 50, 52. For example, one or more memory devices 86 may store the files 60, 66, 72, 78. In addition, the memory device(s) 86 may store software such as the compilers 62, 74, 80 and the synthesis tool 60. Further, the memory device(s) 86 may store the executables 64, 76, as well as the bitstreams 70, 82. The memory device(s) 86 may additionally store control software, configuration software, look up tables, configuration data, etc. The computing system 84 may include one or more processors 88 suitable for executing code stored in the memory device(s) 86, such as the such as the compilers 62, 74, 80 and the synthesis tool 60.

In some embodiments, the processor(s) 88 and/or the memory device(s) 86 may be external to the computing system 84. The memory device(s) 86 may include a tangible, non-transitory, machine-readable-medium, such as a volatile memory (e.g., a random access memory (RAM)) and/or a nonvolatile memory (e.g., a read-only memory (ROM)). The memory device(s) 86 may store a variety of information and be used for various purposes. For example, the memory device(s) 86 may store machine-readable and/or processor-executable instructions (e.g., firmware or software) for the processor(s) 88 to execute, such as instructions to create a xIMD system further described below. The memory device(s) 86 may include one or more storage devices (e.g., nonvolatile storage devices) that may include read-only memory (ROM), flash memory, a hard drive, or any other suitable optical, magnetic, or solid-state storage medium, or any combination thereof.

Figure 3:
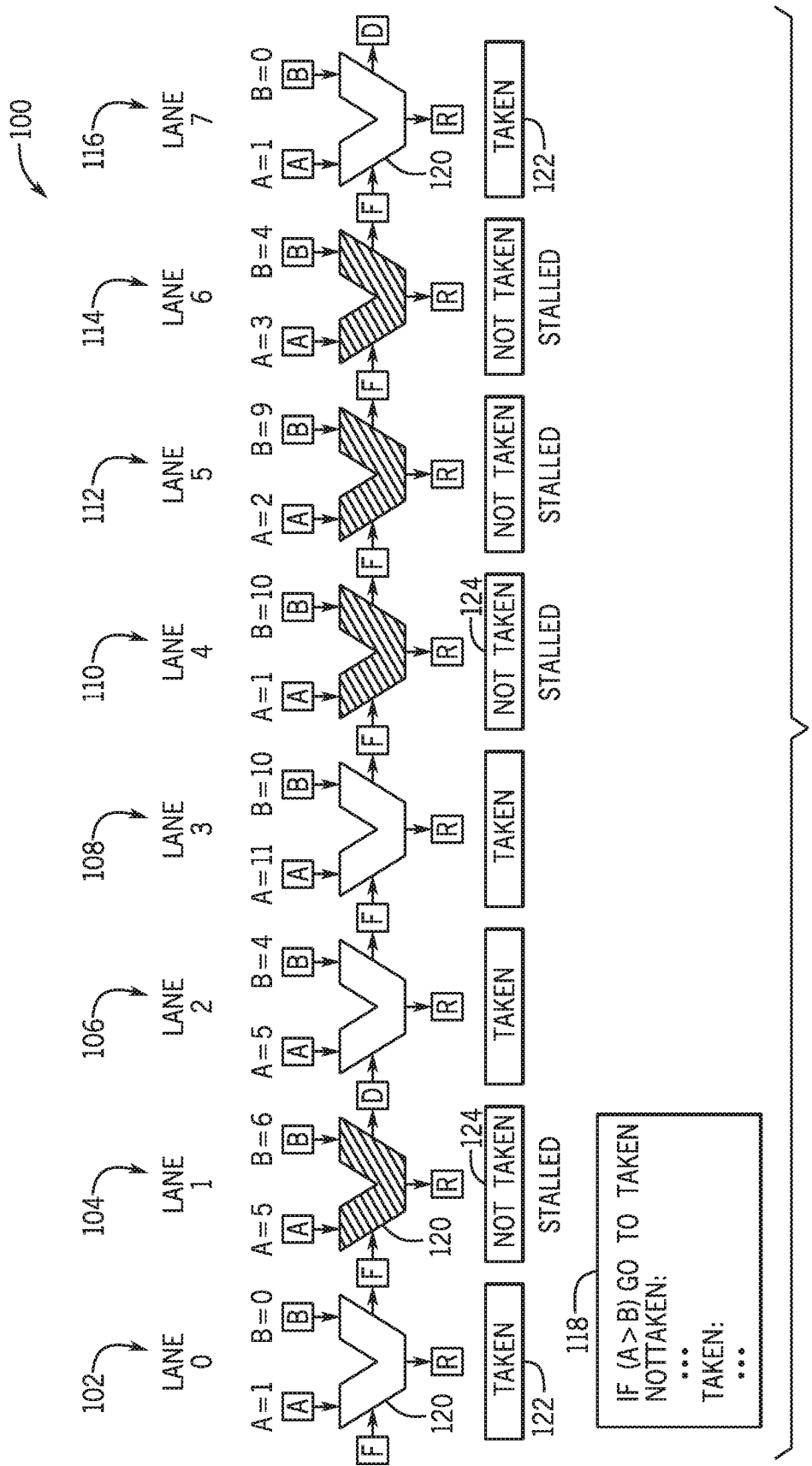
FIG. 3 is a block diagram of an embodiment of a wide SIMD pipeline system.

As mentioned earlier, the integrated circuit 12 may implement xIMD techniques, for example via the hardware design 58. The xIMD techniques may include certain SIMD designs. For example, FIG. 3 is a block diagram of an embodiment of a wide SIMD pipeline system 100 having eight data lanes 102, 104, 106, 108, 110, 112, 114, 116. In the depicted embodiment, all eight data lanes 102, 104, 106, 108, 110, 112, 114, 116 are to process a data dependent branch represented by the "if A>B" logic function 118.

Data-dependent branches may be problematic in traditional wide SIMD machines. For example, before the use of the techniques described herein, a sub-set of SIMD lanes 102, 104, 106, 108, 110, 112, 114, 116 would stall so the other set could continue operation. To illustrate, assume statistically random data. Roughly half of the lanes 102, 104, 106, 108, 110, 112, 114, 116 take the branch and the other half does not take the branch. This case is illustrated in FIG. 3. More specifically if lane 102 determines the dominant branch direction, then lanes 102, 106, 108, and 116 continue execution while lanes 104, 110, 112, 114 are stalled with address NOT TAKEN 124.

To mitigate the effects of data-dependent branches, several techniques may be used, which include conditional instructions, speculative execution and associative controlling. The description that follows is a brief summary of these techniques and the differences found with the xIMD techniques that use automatic creation of secondary execution paths. With conditional instructions, the effect of an instruction on machine state is disabled or enabled by comparison of bits within the instruction word with bits in a designated register. The purpose of this comparison is to minimize the effects of branch delays.

In a SIMD configuration 100, conditional instructions require that every instruction on both sides of the branch 118 must be executed to ensure that both branch condition possibilities are considered across all SIMD lanes 102, 104, 106, 108, 110, 112, 114, 116. This execution has performance implications in practice, e.g., when there is disparity between the probabilities of a taken or not-taken branch; or when the number of instructions in the taken vs not-taken sides of the branch 118 differs significantly, some examples are early exit conditions. The xIMD techniques described herein do not stall or execute excessive instructions in a non-dominant branch direction, and so the performance of the xIMD techniques may be improved over conditional execution.

Speculative execution techniques might also be used to mitigate the effects of branch delays, for example by executing both sides of branch 118 and discarding the results of instructions on a false side of the branch 118. To more fully realize the benefits of speculative execution, hardware support may be used to hold the results of both sides of the branch 118 and apply the taken side 122. The hardware support consumes area, uses additional power, and adds complexity. Similar to conditional instructions, speculative execution may result in executing instructions, which may have no net effect on the machine state.

Another possible solution to the data-dependent branch problem is called Associative Controlling. In Associative Controlling (AC), the program to be executed via the SIMD pipeline 100 is viewed as a graph structure of basic blocks, with the bounds of the basic blocks defined in the conventional sense at branch 118 boundaries. In AC, the instructions to be executed are instrumented with additional instructions and control meta-data to indicate the beginning and end of basic blocks. For example, for every N instructions, a pseudo instruction is inserted to separate the basic blocks into program segments. For the last segment, if its length is less than N, then dummy instructions are inserted to extend the segment. A control bit is set in the last executable instruction of a basic block. Each data path in an AC implementation are then transmitted with the instructions from the padded basic blocks on both sides of the branch. The data path then decides which instructions to execute. An AC implementation assumes a number of controllers, which handle transmission of instruction streams to the data paths. When compared to AC, the xIMD techniques may not involve padding of basic block sections, may not involve insertion of flags in the instruction stream to mark the last executable instruction, and may not involve the level of complexity in the controllers to manage instruction stream transmission latency.

Figure 4:
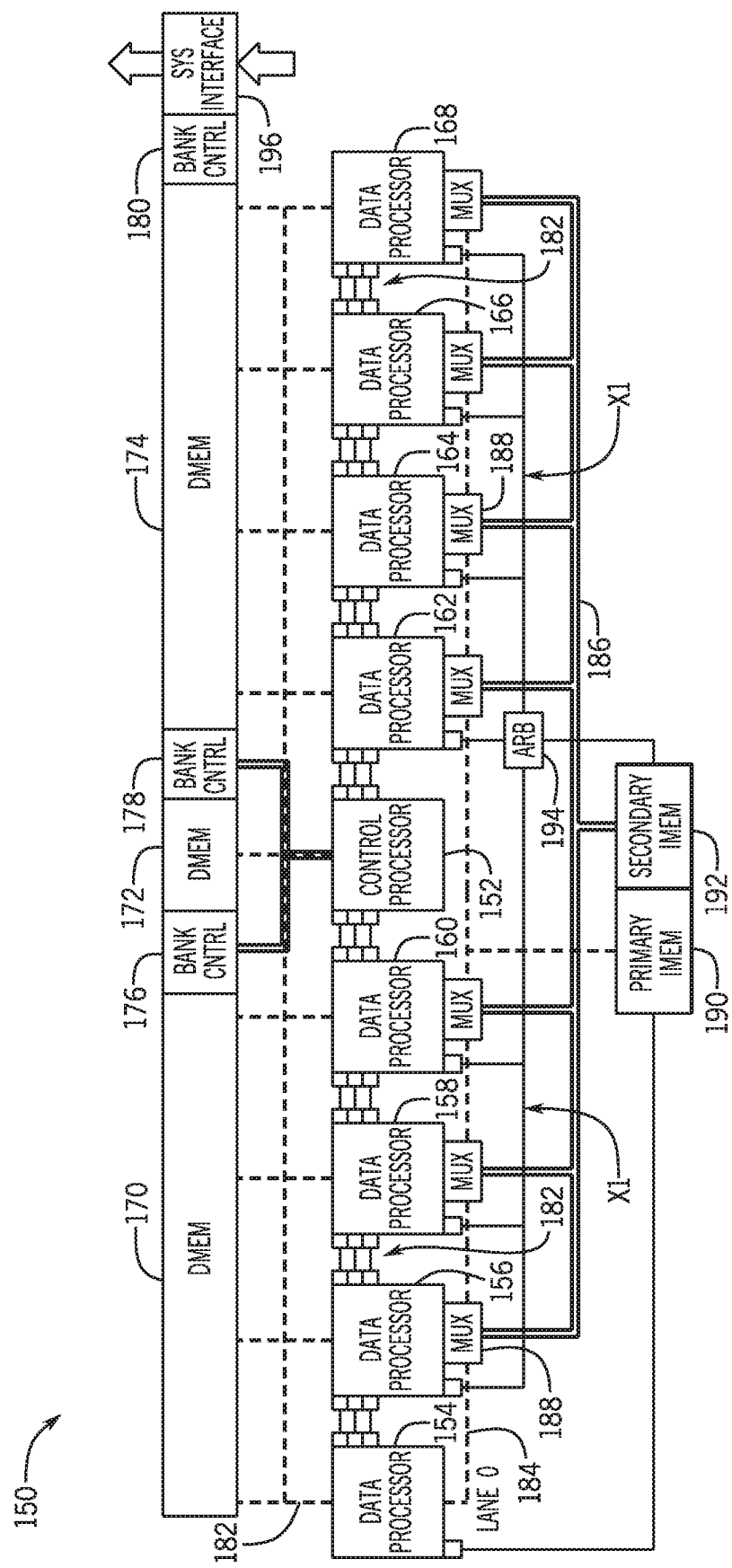
FIG. 4 is an example block diagram illustrating an xIMD system, in accordance with an embodiment of the present disclosure.

Turning now to FIG. 4, the figure is a block diagram illustrating an embodiment of a xIMD computing system 150 that may be used to implement the techniques described herein. The xIMD computing system 150 may contain two processor types, a control processor (CP) 152 and multiple data processors (DPs) 154, 156, 158, 160, 162, 164, 166, 168. The CP 152 may perform loop functions, including prolog/epilog execution, may performs result mask generation, may perform coefficient distribution, and may also perform reduction result gathering for outputs of the DPs 154, 156, 158, 160, 162, 164, 166, 168. The DPs 154, 156, 158, 160, 162, 164, 166, 168 perform the bulk of the program execution, typically operations on very precise (wide) floating point values. Accordingly, the CP 152 and DPs 154, 156, 158, 160, 162, 164, 166, 168 may be used for a variety of applications, such as a data center, network device, server, router, switch, gateway, firewall, bridge, hub, database, workstation, desktop computer, laptop computer, mobile device, wireless access point, wireless access device, and the like.

The CP 152 may include a dual issue or more machine (e.g., a processor that can move two instructions or more from one stage of a pipeline to another) with a 32-bit+32-bit instruction word. The CP 152 may be load/store RISC machines in nature, with complex instructions included to support loop setup functions as well as custom instructions supporting Basic Linear Algebra Subprograms (BLAS) and other application programming interfaces (APIs). The CP 152 may be more optimized for efficient looping, and may include minimal arithmetic support, (e.g., no multiplier, divider, no floating point support, and so on). CP instruction encoding may support up to 64 registers with destructive operations and 32 registers for 3 operand non-destructive operations. An execution pipeline included or supported by the CP 152 may include four stages: F (fetch), D (decode), E1 (execute 1), and E2 (execute 2). A WB (write back) stage may overlap the decode stage. There may be no explicit memory stage; forwarding by a register file may be applied to reduce a load use penalty. There CP 152 may include two executable branch delay slots mitigated by hardware support for zero delay loops.

DPs 154, 156, 158, 160, 162, 164, 166, 168 may include single issue machines (e.g., processors that execute a single instruction per clock cycle) with a 48-bit instruction word. The instruction set for a DP 154, 156, 158, 160, 162, 164, 166, 168 may be biased towards arithmetic operations and may include more extensive SIMD instructions. Integer forms may be supported by the DPs 154, 156, 158, 160, 162, 164, 166, 168 but there may be no support for extended floating point precision. DP instruction encoding may support at least up to 128 registers for 3 operand non-destructive operations. Destructive operations may not be involved. A DP execution pipeline may include six stages: F (fetch), D (decode), and E1-E4 (execute 1-4). Similar to the CP 152, a DP WB (write back) stage overlaps the decode stage. There may be no explicit memory stage, with a register file supporting forwarding. The DP instruction set may include a limited number of load and store instructions. Accordingly, a bulk of the load/store instruction types are supplied by the CP 152. Control signals for the load/store operations may be propagated across the DPs 154, 156, 158, 160, 162, 164, 166, 168.

Also shown are data memory banks 170, 172, 174, which may be controlled via respective bank controllers 176, 178, 180. The bank controllers may receive commands, for example, from the CP 152. Data may thus flow into/out of the DPs 154, 156, 158, 160, 162, 164, 166, 168 via data conduits 182. Communication between adjacent DPs 154, 156, 158, 160, 162, 164, 166, 168 may be provided via interprocess communication (IPC) conduits 182, for example for synchronization between DPs. Conduits 184, 186 may be multiplexed via multiplexers 188 to move data between the DPs 154, 156, 158, 160, 162, 164, 166, 168 and a primary instruction memory 190 and between the DPs 154, 156, 158, 160, 162, 164, 166, 168 and a secondary instruction memory 192. An arbitration system 194 may be used to arbitrate between the DPs 154, 156, 158, 160, 162, 164, 166, 168, the primary instruction memory 190, and the secondary instruction memory 192. Lanes 102, 104, 106, 108, 110, 112, 114, 116 shown in FIG. 3 may correspond to processing done by the DPs 154, 156, 158, 160, 162, 164, 166, 168 respectively.

FIG. 4 also shows one embodiment of the system 150 that uses two instruction memories, primary instruction memory (IMEM) 190 and secondary IMEM 192. The number of instruction memories is not critical to the fundamental operation of the dominant lane selection or other aspects of the self-organizing nature of the system 150. The number of instruction memories is a performance versus die area tradeoff.

In the embodiment shown in FIG. 4, lane 0, served via data processor 154, generates the instruction memory addresses and supplies this to primary IMEM 190. The instruction stream from primary IMEM 190 is supplied on bus 184 and distributed to multiplexers 188 for each data processors 154, 156, 158, 160, 162, 164, 166, 168. Whether the data processors use this instruction stream is determined by the select settings for each multiplexer 188. These select settings are driven by the arbitration system 194, the value of the drive settings is determined by the dominant lane selection logic as described herein.

From reset, all lanes are executing from the instruction stream supplied on bus 184. During the course of operation, more dominant lanes may be created. In the embodiment in FIG. 4, access to secondary IMEM 192 by dominant lanes, other than Lane 0, is arbitrated by arbitration system 194. Instruction addresses are supplied to arbitration system 194 using bus X1. The arbitration system 194 uses the arbitration scheme to select one of the secondary dominant lanes instruction address and supplies this to secondary IMEM 192. The instructions from secondary IMEM 192 are supplied on bus 186 and the multiplexer 188 of each lane determines whether the primary or secondary instructions are received by the data processors 154, 156, 158, 160, 162, 164, 166, 168. In the example embodiment used for explanation, the arbitration scheme is programmable by the control processor 152.

In the example embodiment of the system 150 used for explanation purposes, increasing the number of instruction memories may reduce the performance effect of arbitration. Other embodiments of the system 150 may reduce the effects of arbitration by increasing the number of read ports of the instruction memories 190, 192. System 150 configuration instructions may be provided so the system 150 configuration can also be controlled by software. In one embodiment, the system 150 configuration instructions are executed by control processor 152, communicated to the data processor 154, and communicated to the arbitration system 194. In other embodiments, these instructions are executed by any of the data processors 154, 156, 158, 160, 162, 164, 166, and/or 168 by external logic via the system interface 196. In a preferred embodiment, the control processor 152, the data processors 154, 156, 158, 160, 162, 164, 166, 168, and the system interface 196 would all issue these configuration instructions.

SYNC is a synchronization instruction that configures the system 150 in the full SIMD configuration. DIS is a disassociate instruction, which performs the opposite of SYNC, configuring each lane to operate independently, thus providing the full MIMD configuration. REMAP is a remapping instruction allowing arbitrary grouping of lanes, e.g., a first grouping of SIMD lanes, a second grouping of MIMD lanes, or a combination thereof. By using the SYNC/DIS/REMAP instruction set, the system 150 may be configured to compute in pure SIMD, in pure MIMD, and in xIMD modes. The SYNC/DIS/REMAP instruction set may be used on their own (i.e. without automatic new dominant lane selection/forking), in combination with automatic dominant lane selection/forking, or not used at all (i.e., resulting in automatic new dominant lane selection/forking).

When executed by data processors 154, 156, 158, 160, 162, 164, 166, 168, the SYNC instruction may also perform barrier operation. That is, on decode of a SYNC instruction, the data processors 154, 156, 158, 160, 162, 164, 166, 168, may halt further execution, enter a wait loop, and signal to the control processor 152 that there is a halt, using bus 182. Once all data processors 154, 156, 158, 160, 162, 164, 166, 168, have halted, the control processor 152 would then execute a REMAP instruction to configure the system 150 as desired. REMAP may communicate with the arbitration system 194 and with data processors 154, 156, 158, 160, 162, 164, 166, 168, using bus 182.

Figure 5:
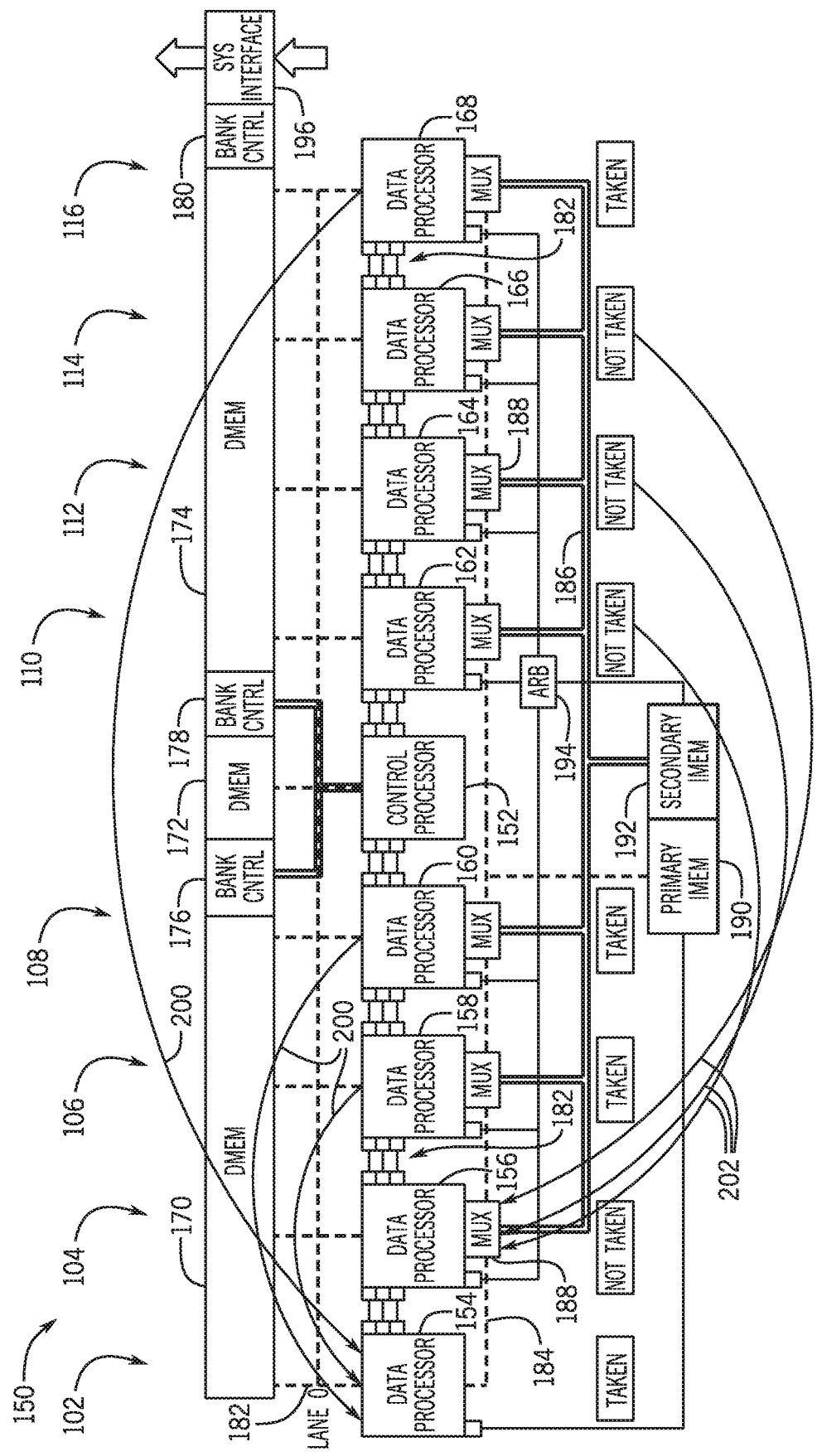
FIG. 5 is an example block diagram illustrating the xIMD system of FIG. 4 with forking, in accordance with an embodiment of the present disclosure.

During execution of a program via the xIMD computing system 150, as shown in FIG. 5, at reset (e.g., beginning of the execution of the program) all lanes are executing code from the primary instruction memory. Because the figure shows same elements as FIG. 4, the same elements are shows using same numbers. Lane 0 (e.g., labeled 102 and processed via DP 154) controls the program counter (PC) for the primary instruction memory. Lane 0 (e.g., labeled 102 and processed via DP 154) is the default dominant lane. As execution proceeds, a data-dependent branch is decoded and either taken or not-taken by each lane 104, 106, 108, 110, 112, 114, 116 (e.g., corresponding to DPs 156, 158, 160, 162, 164, 166, 168). Those lanes whose taken/not-taken state is the same as lane 0 (e.g., labeled 102 and processed via DP 154) continue to have their instruction stream generated by lane 0. In the depicted embodiment, the lanes 106, 108, and 116 corresponding to DPs 158, 160, 168 would still have their instruction stream generated by lane 0 (e.g., labeled 102 and processed via DP 154) as shown via arrows 200.

In the depicted embodiment, the other lanes 104, 110, 112, 114 corresponding to DPs 156, 162, 164, 166 automatically select a new dominant lane, in this case, lane 104, as shown via arrows 202. For the purposes of explanation, this new dominant lane selection is called a fork. A fork creates a new program counter thread for the other lanes 104, 110, 112, 114. This dominant lane 104 (e.g., corresponding to DP 156) now controls the program counter for a secondary instruction memory 192. Access to the secondary instruction memory 192 is arbitrated via arbitration system 194.

As execution continues additional data-dependent branches may potentially create new fork conditions, and thus new dominant lanes may be automatically selected for these new forks. These new dominant lanes now arbitrate for access to the secondary instruction memory 192 via arbitration system 194. A synchronization instruction (e.g., transmitted via conduits 182) creates a barrier allowing all lanes to complete, but may be optional.

Lanes are numbered 0-N, left to right. The left most lane, Lane 0 (e.g., labeled 102 and processed via DP 154), may always be a dominant lane. Lanes which are not dominant lanes are referred to herein as subordinate lanes. A dominate lane and its subordinate lanes are referred to as a lane group. Dominant lanes generate the instruction address streams for the lane group. In one embodiment, at reset all lanes are in a single group, with Lane 0 as their dominant lane. This configuration is referred to herein as the full SIMD configuration because all the lanes are currently operating as SIMD lanes. The system 150 is always in the full SIMD configuration after reset.

During execution, the arbitration system 194 drives control signals for the multiplexers 188. The setting of multiplexers 188 controls the instruction streams seen by the lane. In full SIMD, the same instruction is executed by each lane 0-N (e.g., labeled 104, 106, 108, 110, 112, 114, 116 and corresponding to DPs 154, 156, 158, 160, 162, 164, 166, 168). During execution of the instruction stream, data dependent branches, such as "if (A>B)" 120, will be executed. Based on the result of the Boolean operation, A>B, reported as TAKEN/NOTTAKEN, the system 150 will self-organize away from the full SIMD configuration towards an increasingly MIMD configuration, potentially up to a full MIMD configuration. In the full MIMD configuration all lanes (e.g., labeled 104, 106, 108, 110, 112, 114, 116 and corresponding to DPs 154, 156, 158, 160, 162, 164, 166, 168) are dominant lanes and all lanes are executing instruction streams created by that lane.

The result of the Boolean operation, TAKEN/NOT-TAKEN, may be called the branch state. The branch states of dominant lane(s) are received by the subordinate lanes. The arbitration system 194 may generate control bits which control which dominant lane branch state is seen by the subordinate lanes. The arbitration system 194 may include status bits for each lane. These are referred to as the lane's history bits. The history bits store each lane's current and previous dominant lane. The arbitration system 194 may generates control signals, labelled X1. These X1 control signals may then route the correct dominant branch states to the subordinate lanes.

On the execution of the data dependent branch, the arbitration system 194 copies each lane's current history bits to the previous history bits. Each lane then compares its branch state with that of its assigned dominate lane and reports the results to the arbitration system 194 using X1. If the branch states are equal, the selects for multiplexer 188 for the lane are not changed. In one embodiment, the only action performed is that the arbitration system 194 updates the history bits, e.g., the current history are copied to the previous history bits.

If the branch states are not equal, then those lanes which differ from the dominant branch state will select a new dominant lane. The arbitration system 194 may contain a priority encoding of the lane positions, where lane 0 has higher priority than lane N. Presume lane LANE, must select a new dominant lane, DOM. The arbitration system 194 may choose the new dominant lane based on certain criterion. For example, to be selected as the new dominant lane, 1) DOM must have the same branch state as LANE, 2) DOM's lane position must be lower than LANE (i.e. DOM's position must be to the left of LANE) and 3) DOM's history bits must match the history bits for LANE.

If the criterion is met, DOM is selected as LANE's new dominant lane. The arbitration system 194 may then copy LANE's current history bits to LANE's previous history bits. The arbitration system 194 may then write DOM's lane position to LANE's current history bits. Finally, the arbitration system 194 may adjust the selects of multiplexer 188 for LANE. LANE may now receive an instruction stream generated from DOM's address stream.

If the criterion is not met, LANE becomes its own dominant lane. The arbitration system 194 may copy LANE's current history bits to LANE's previous history bits. The arbitration system 194 may write LANE's lane position to LANE's current history bits. When all lanes are their own dominant lanes the system 150 is in a full MIMD configuration. Accordingly, the xIMD system 150 may transition from full SIMD to partial and/or full MIMD. Note that the described process may allow each lane to update its dominant lane selection independently and in parallel. Also, only a current and previous dominant lane history may be required. The system 150 may thus be self-organizing and can migrate towards full MIMD as warranted by the execution behavior, thus reducing the impact of stalls due to data dependent branches. An example process and pseudocode for migration from SIMD to MIMD is given in FIG. 8 below.

Figure 6:
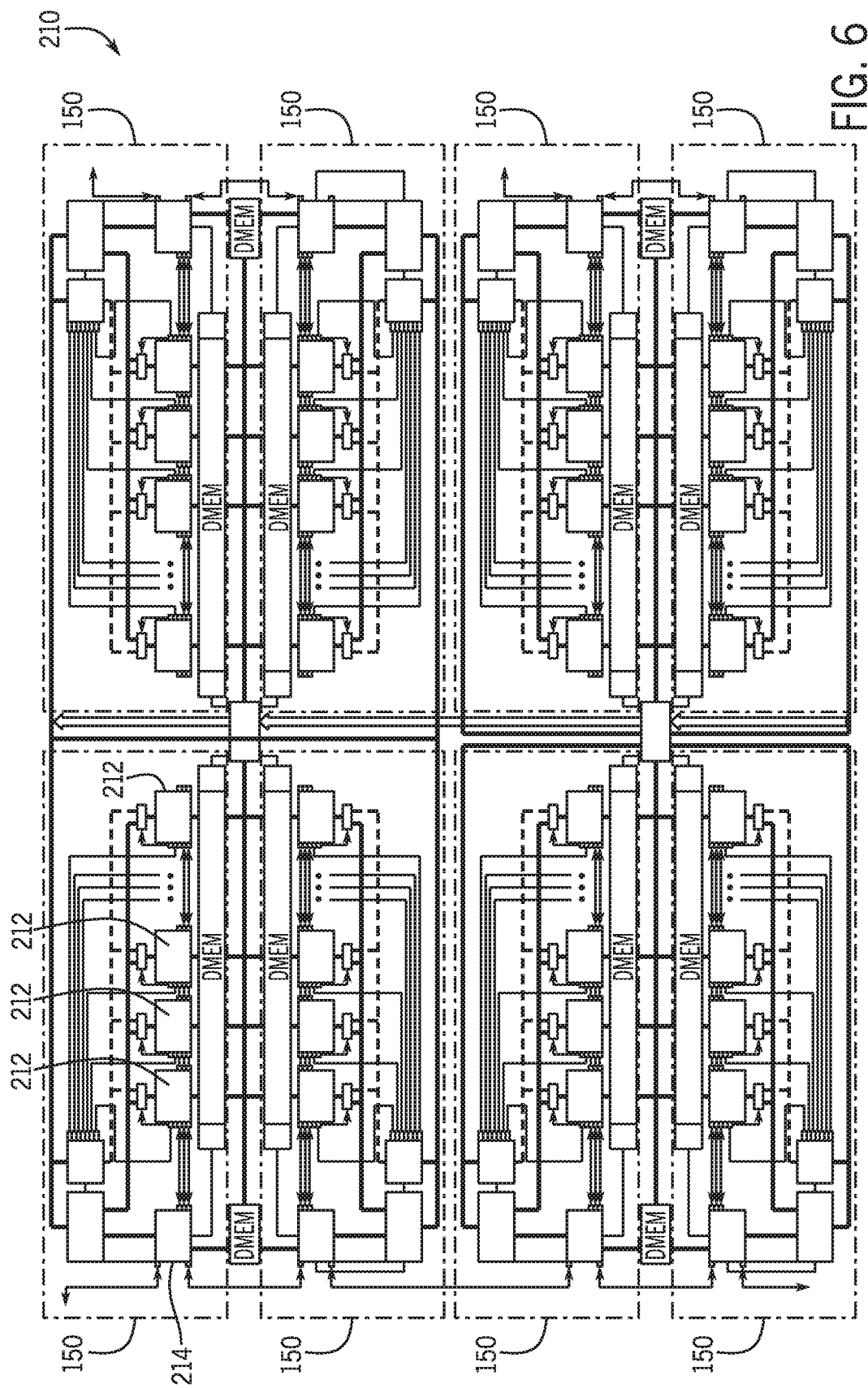
FIG. 6 is a block diagram of an embodiment of a cluster of 8 xIMD systems.

Turning now to FIG. 6, the is a block diagram of an embodiment of a cluster 210 of 8 xIMD systems 150 which may be interconnected for data processing. For example, via the system interface 196 may be used in synchronizing data flow, memory access and son on, through the cluster 210. As mentioned earlier, each xIMD system 150 has one or more DPs 212 which are used to execute the same instruction but may fork as described herein. The DPs 212 illustrated herein are equivalent to the DPs 154, 156, 158, 160, 162, 164, 166, 168 shown in FIGS. 4 and 5. Accordingly, there may be 1, 2, 3, 4, 5, 6, 7, 8, 9, 10 or more DPs 12. The DPs 212 may be assisted via the CP 214, which is equivalent to the CP 152 shown in FIGS. 4 and 5. As mentioned earlier, the CP 214 may perform loop functions, including prolog/epilog execution, perform result mask generation as well as coefficient distribution, and reduction result gathering. By enabling clusters of xIMD systems 150, the techniques disclosed herein provide for more efficient computation, such as parallel computation of SIMD-enhanced functions.

Figure 7:
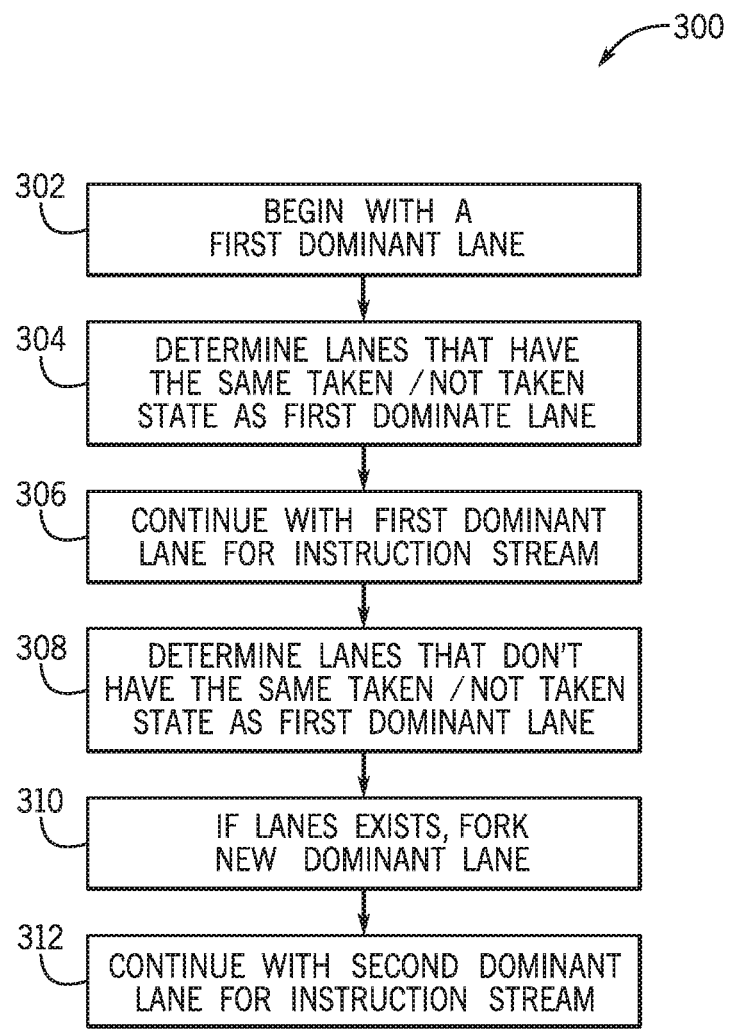
FIG. 7 is a flow chart of an example process for xIMD instruction execution and forking, in accordance with an embodiment of the present disclosure.

FIG. 7 is a flow chart illustrating an embodiment of a process 300 that may be used, for example, to implement certain of the techniques described herein. While the illustrated embodiment may be implemented via the integrated circuit 12, it is to be understood that the techniques described herein may be implemented in other chip types, including traditional microprocessors, application-specific integrated circuits (ASICs), custom chip designs, and so on. As illustrated, the process 300 may begin (block 302) with a first dominant lane, such as the lane 0 (e.g., labeled 103 in the previous figures). The first dominant lane (e.g., lane 0) controls the program counter (e.g., counter containing an instruction address) for the primary instruction memory 190. As program execution proceeds, a data-dependent branch is decoded and either taken or not-taken by each lane. The process 300 may then automatically determine (block 304) lanes whose taken/not-taken state is the same as the dominant lane. The lanes that share the taken/no-taken state as the dominant lane continue (block 306) to have their instruction stream generated by the dominant lane, and may be using the primary instruction memory 190.

The process 300 may also automatically determine (block 308) lanes whose taken/not-taken state is not the same as the dominant lane. If any lanes exist whose taken/not-taken state is not the same as the dominant lane exist, the process 300 will fork (block 310) a new dominant lane. Execution (block 312) of the lanes whose taken/not-taken state is not the same as the dominant lane use an instruction stream generated by the new dominant lane, and may be using the secondary memory 192. Accordingly, memory access to the first and the second primary instruction memories, in the depicted embodiment, is arbitrated. In this manner, all lanes, e.g., lanes 102, 104, 106, 108, 110, 112, 114, 116 may be executing the same instruction as in SIMD systems, but may fork when data dependency arise. The xIMD system 150 may provide for more efficient execution of parallel instructions including instructions that have data dependent execution branches.

Figure 8:
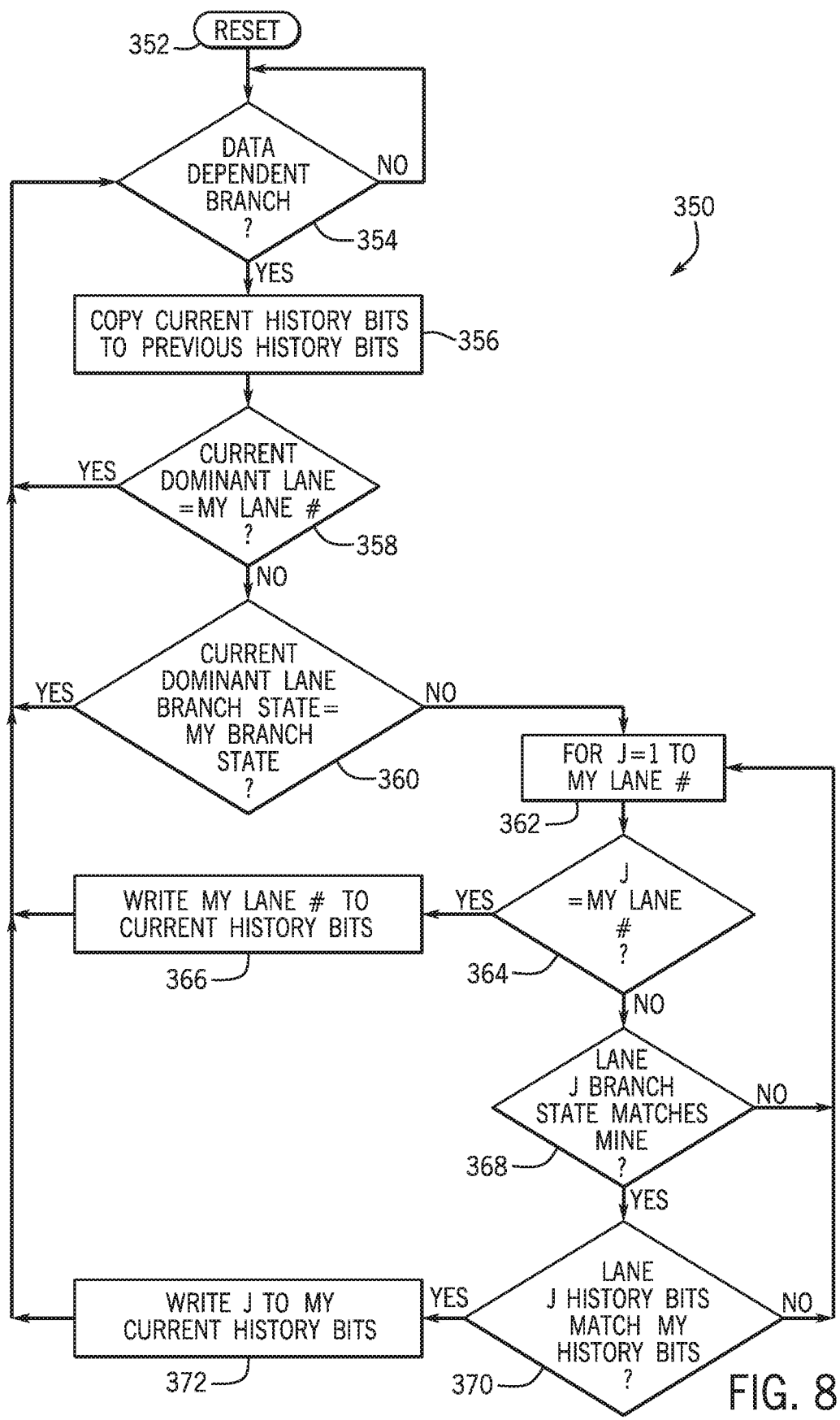
FIG. 8 is a flow chart of an example process for xIMD instruction execution and forking from a point of view of a current lane being processed, in accordance with an embodiment of the present disclosure.

FIG. 8 is a flowchart illustrating an embodiment of a process 350 which may show a logical flow of the dominant lane selection from the point of view of one lane. More details of the arbitration system 194 operations are also shown in FIG. 8. While the illustrated embodiment of the process 350 may be implemented via the integrated circuit 12, it is to be understood that the techniques described herein may be implemented in other chip types, including traditional microprocessors, application-specific integrated circuits (ASICs), custom chip designs, and so on. As illustrated, the process 350 may begin (block 352) with a reset state. The reset state has the system 150 in the full SIMD configuration.

If there is a data dependent branch (decision 154), current history bits may be copied to previous history bits (block 356) for the lane being processed. If the lane being processed is not already its own dominant lane (decision 358), then the process 350 may determine (decision 360) if the current dominant lane is equal to the position of the lane being processed. If the current dominant lane is equal to the position of the lane being processed (decision 360) then no further changes may need to be made for the lane being processed. That is, if the current dominant lane has the same branch state as the lane being processed (decision 360), then no further processing is required. A loop is shown in block 362, decision 364, block 366, decision 368, decision 370, and block 372. This loop is a logical abstraction of the priority encoder scheme used in the implementation of the process 350. The priority encoder performs the operations in parallel.

In the loop which includes block 362, decision 364, block 366, decision 368, decision 370, and block 372, lanes to the left of the current lane (i.e., the lane being processed) are inspected to determine if there is a candidate for a new dominant lane. The candidate is called LANE[J]. In decision 364, if LANE[J] is the same as the current lane then the current lane's own lane position is written to the current history bits, as in block 366. Subsequently in decision 368, LANE[J]'s branch state is compared to the current lane's branch state. If there is a mismatch (decision 368) the process returns to the head of the loop, i.e., block 362. In decision 370, the current and previous history bits of LANE[J] are compared to the current lane. If there is a mismatch (decision 370), the process 350 returns to the head of the loop at block 362. If they match (decision 370), LANE[J] is selected as the current lane's new dominant lane and this lane's history bits are written with J as in block 372 and all processing for the current lane is complete and the process 350 returns to decision 354.

An example pseudocode with line numbers that may be used to implement the process 350 may be as follows:

---

1. Variables
2. Lane[ ] represents the values for each lane
3. Lane[ ].branchState is the result of the boolean operation
4. Lane[ ].currentDominantLane holds the lane number of the current dominant lane for this lane -continued

```
5.  Lane[ ].previousDominantLane holds the lane number of the previous dominant
lane
6.
7.  //For each lane from 1 to N
8.  for(int i=1;i<=N;++i) {
9.
10.     //compare this lanes branch state to the state of its dominant lane
11.
12.     //get my branch state
13.     myBrState = lane[i].branchState
14.
15.     //get my dominate lanes branch state
16.     myDomLane = lane[i].currentDominantLane
17.     domLaneBrState = lane[myDomLane].branchState
18.
19.     //if this statement is true then this lane matches its dominant lane
20.     //Update the history bits and continue with the other lanes
21.     if(myBrState == domLaneBrState) {
22.         lane[i].previousDominantLane = lane[i].currentDominantLane;
23.         continue
24.     }
25.
26.     //this lane does not match its dominant, find a new dominant lane
27.     //and update as needed
28.
29.     //Loop through the lanes to the left of this lane
30.     //In hardware this is down using a priority encoder and not a loop
31.     for(int j=1;j<=i;++j) {
32.
33.         //no lane to the 'left' was found to be suitable,
34.         //so this lane becomes it's dominant lane
35.         if(j==i) {
36.             lane[i].previousDominantLane = lane[i].currentDominantLane;
37.             lane[i].currentDominantLane = i;
38.             //this lane is done, break out of the j loop
39.             break;
40.         }
41.
42.         //compare the history bits for the candidate dominant lane
43.         bool prevMatch = lane[j].previousDominantLane ==
lane[i].currentDominantLane;
44.         bool brStateMatch = lane[j].branchState  == lane[i].branchState;
45.
46.         //if a suitable lane is found capture the data
47.         if(prevMach && brStateMatch) {
48.             lane[i].previousDominantLane = lane[i].currentDominantLane;
49.             lane[i].currentDominantLane = j;
50.
51.             //this lane is done, break out of the j loop
52.             break;
53.         }
54.
55.         //otherwise keep processing the other left side lanes
56.     }
57. }
```

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . . " or "step for [perform]ing [a function]. . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An integrated circuit, comprising:
a mixed instruction multiple data (xIMD) computing system, comprising:
a plurality of data processors, each data processor representative of a lane of a single instruction multiple data (SIMD) computing system, wherein the plurality of data processors are configured to use a first dominant lane for instruction execution and to fork a second dominant lane when a data dependency instruction that does not share a taken/not-taken state with the first dominant lane is encountered during execution of a program by the xIMD computing system.

2. The integrated circuit of claim 1, wherein a first set of the plurality of data processors are configured to use a first program counter controlled by the first dominant lane, and wherein a second set of the plurality of data processors are configured to use a second program counter controlled by the second dominant lane during execution of the dependency instruction.

3. The integrated circuit of claim 2, wherein the first set of the plurality of data processors comprise data processors representative of lanes sharing the taken/not-taken state with the first dominant lane.

4. The integrated circuit of claim 2, wherein the second set of the plurality of data processors comprise data processors representative of lanes not sharing the taken/not-taken state with the first dominant lane.

5. The integrated circuit of claim 1, wherein the xIMD computing system comprises a control processor communicatively coupled to the plurality of data processors and configured to perform a loop function, a result mask generation, a coefficient distribution, a reduction result gathering from outputs of the plurality of data processors, or a combination thereof, for the xIMD computing system.

6. The integrated circuit of claim 5, wherein the control processor comprises a dual issue processor.

7. The integrated circuit of claim 1, wherein the plurality of data processors are configured to perform SIMD processing, multiple instruction multiple data (MIMD) processing, or a combination thereof, via a SYNC instruction, a DIS instruction, a REMAP instruction, or a combination thereof.

8. The system of claim 1, comprising a cluster having a plurality of xIMD systems, wherein the xIMD system is included in the cluster.

9. The integrated circuit of claim 1, wherein the xIMD system is included in a field programmable gate array (FPGA).

10. A system, comprising:
a processor configured to:
receive circuit design data for a mixed instruction multiple data (xIMD) computing system, the xIMD computing system comprising:
a plurality of data processors, each data processor representative of a lane of a single instruction multiple data (SIMD) computing system, wherein the plurality of data processors are configured to use a first dominant lane for instruction execution and to fork a second dominant lane when a data dependency instruction that does not share a taken/not-taken state with the first dominant lane is encountered during execution of a program by the xIMD computing system; and
implement the circuit design data by generating the xIMD computing system as a bitstream.

11. The system of claim 10, wherein a first set of the plurality of data processors are configured to use a first program counter controlled by the first dominant lane, and wherein a second set of the plurality of data processors are configured to use a second program counter controlled by the second dominant lane during execution of the dependency instruction.

12. The system of claim 10, wherein the first set of the plurality of data processors comprise data processors representative of lanes sharing the taken/not-taken state with the first dominant lane, and wherein the second set of the plurality of data processors comprise data processors representative of lanes not sharing the taken/not-taken state with the first dominant lane.

13. The system of claim 12, wherein the xIMD computing system comprises a control processor communicatively coupled to the plurality of data processors and configured to perform a loop function, a result mask generation, a coefficient distribution, a reduction result gathering from outputs of the plurality of data processors, or a combination thereof, for the xIMD computing system.

14. The system of claim 13, wherein the plurality of data processors are configured to perform SIMD processing, multiple instruction multiple data (MIMD) processing, or a combination thereof, via a SYNC instruction, a DIS instruction, a REMAP instruction, or a combination thereof.

15. The system of claim 10, wherein the circuit design data comprises a cluster having a plurality of xIMD systems, wherein the xIMD system is included in the cluster, and wherein the processor is configured to implement the circuit design data by generating the cluster.

16. The system of claim 10, wherein the processor is configured to receive a program logic file comprising software instructions to be executed by a second processor, wherein the second processor is configured to use the xIMD system for data processing, and wherein the processor is configured to generate an executable file for execution by the second processor based on the program logic file.

17. A method, comprising:
receiving a plurality of data inputs;
executing a program via a mixed instruction multiple data (xIMD) computing system to process the plurality of data inputs, wherein the xIMD computing system comprises:
a plurality of data processors, each data processor representative of a lane of a single instruction multiple data (SIMD) computing system, wherein the plurality of data processors are configured to use a first dominant lane for instruction execution and to fork a second dominant lane when a data dependency instruction that does not share a taken/not-taken state with the first dominant lane is encountered during execution of a program by the xIMD computing system; and
outputting program results to a user based on the executing of the program via the xIMD computing system.

18. The method of claim 17, wherein a first set of the plurality of data processors are configured to use a first program counter controlled by the first dominant lane, and wherein a second set of the plurality of data processors are configured to use a second program counter controlled by the second dominant lane during execution of the dependency instruction.

19. The method of claim 17, wherein the first set of the plurality of data processors comprise data processors representative of lanes sharing the taken/not-taken state with the first dominant lane, and wherein the second set of the plurality of data processors comprise data processors representative of lanes not sharing the taken/not-taken state with the first dominant lane.

20. The method of claim 17, wherein the xIMD computing system comprises a control processor communicatively coupled to the plurality of data processors and configured to perform a loop function, a result mask generation, a coefficient distribution, a reduction result gathering from outputs of the plurality of data processors, or a combination thereof, for the xIMD computing system.

* * * * *